May 28, 1929.  W. H. FORSYTH  1,715,284
AEROPLANE
Filed June 3, 1927   2 Sheets-Sheet 1
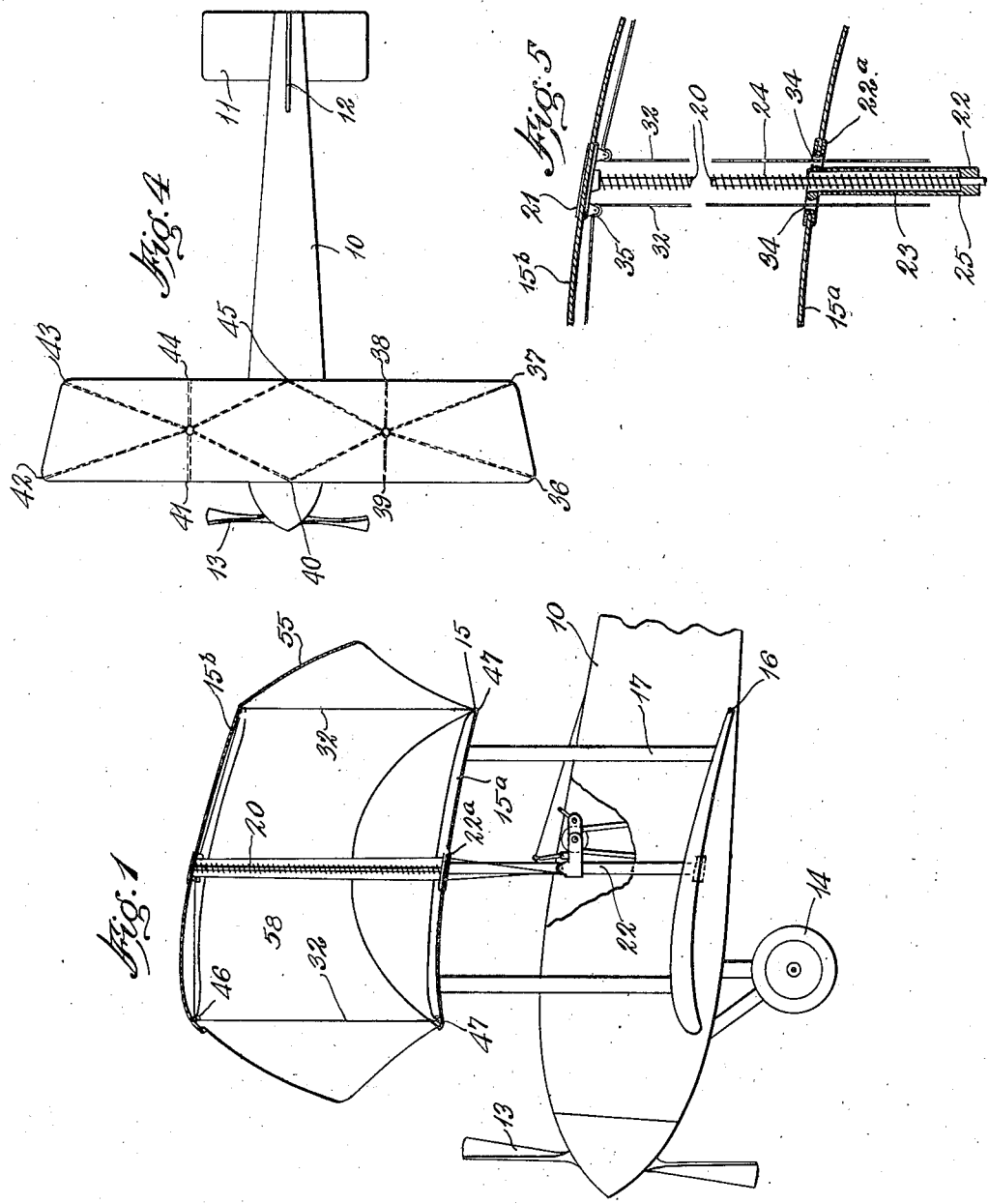
INVENTOR
William H. Forsyth
BY
ATTORNEY May 28, 1929. W. H. FORSYTH 1,715,284
AEROPLANE
Filed June 3, 1927 2 Sheets-Sheet 2
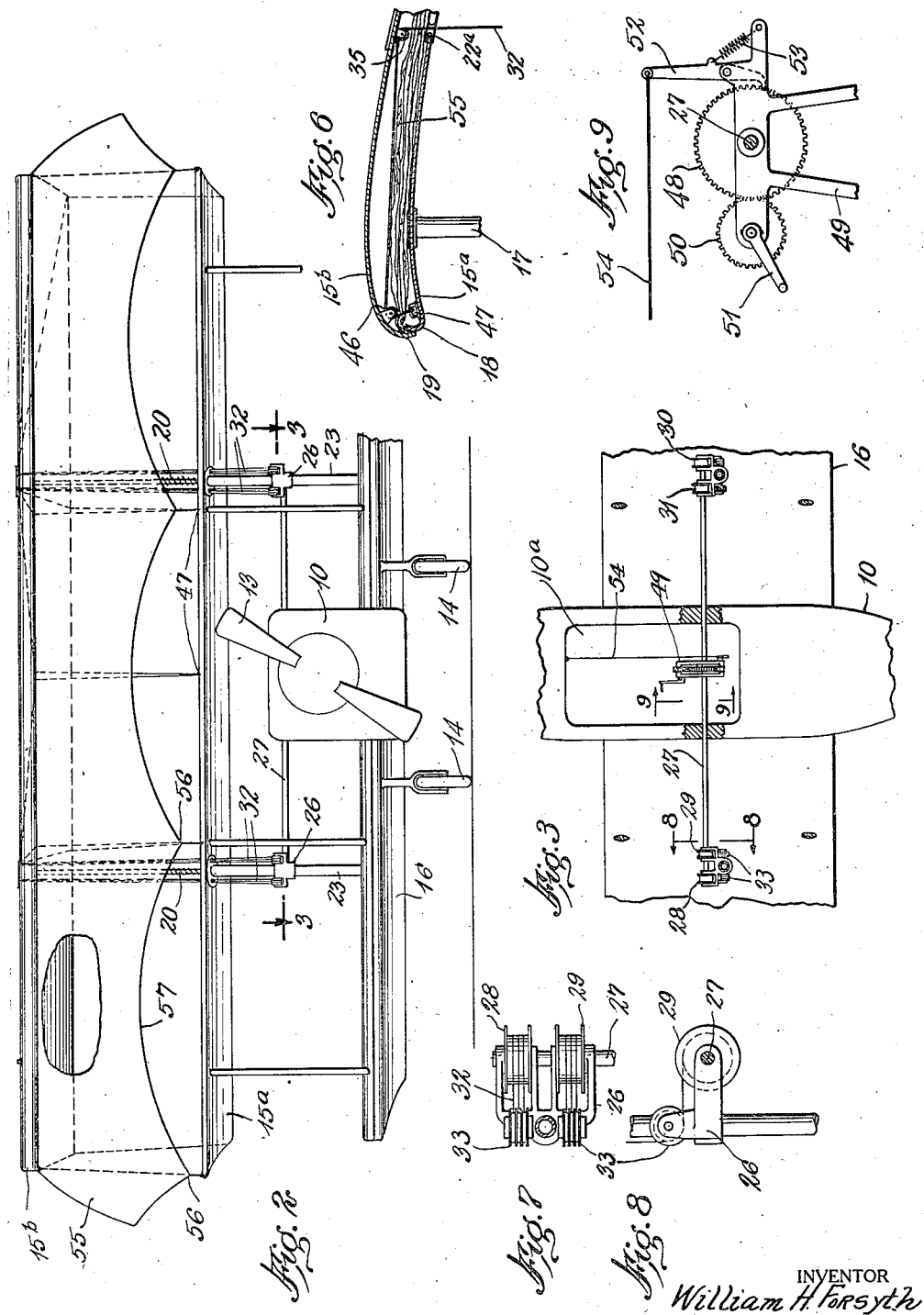
INVENTOR
William H Forsyth
BY
ATTORNEY Patented May 28, 1929.

1,715,284

UNITED STATES PATENT OFFICE.

WILLIAM H. FORSYTH, OF WESTWOOD, NEW JERSEY; FLORENCE ACKERMAN FORSYTH EXECUTRIX OF SAID WILLIAM H. FORSYTH, DECEASED.

AEROPLANE.

Application filed June 3, 1927. Serial No. 196,220.

This invention relates to aeroplanes and particularly to the provision of means for sustaining an aeroplane against sudden descent, in the event of the aeroplane becoming inoperative for any reason, and to provide a slow lighting of the aeroplane to avoid destruction thereof; and the object of the invention is to provide, in combination with an aeroplane of any kind or class and regardless of the specific type thereof, stabilizing means in the form of a parachute body adapted to be moved into operative position by the operator of the machine, and materially increase the load supporting and stabilizing area of the machine; a further object being to provide an apparatus, of the class specified, built into and constituting part of the supporting plane, or one of the supporting planes of an aeroplane; a further object being to provide an aeroplane with a supporting plane composed of separate top and bottom plane members adapted to be moved into spaced relation to increase the supporting and stabilizing area and surface of an aeroplane, the upper plane member having, placed in extended position, downwardly extending skirt portions around the periphery thereof, forming of said member a substantial parachute body; a further object being to provide means for retaining the parachute structure or supplemental supporting planes into normal or inoperative position; and with these and other objects in view the invention consists in an apparatus of the class and for the purpose specified which is simple is construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a sectional side view of a part of an aeroplane illustrating one use of my invention;

Fig. 2 is a front view of the structure shown in Fig. 1, with parts of the construction broken away;

Fig. 3 is a partial section on the line 3—3 of Fig. 2;

Fig. 4 is a plan view of an aeroplane indicating the arrangement of the stay cables or wires for supporting my improved parachute or stabilizing plane;

Fig. 5 is a view similar to Fig. 1 but showing only part of the construction on an enlarged scale;

Fig. 6 is a sectional, detail view of the main supporting plane of the aeroplane, with parts in normal and collapsed position;

Fig. 7 is a sectional plan view with part of the construction shown in Fig. 3 on an enlarged scale;

Fig. 8 is a section on the line 8—8 of Fig. 3; and

Fig. 9 is a section on the line 9—9 of Fig. 3.

In the drawing, I have shown for the purpose of illustrating one method of carrying my invention into effect, a bi-plane type of aeroplane, it being understood, however, that the invention may be employed in connection with any type of plane, and in the drawing 10 represents the body or fuselage of the machine, 11 the tail plane, 12 the rudder, 13 the propeller, 14 the landing or traction wheels and 15 and 16 the upper and lower front supporting planes braced and coupled together by the vertical stays 17.

In the construction shown, the upper supporting plane 15 is constructed of two independent members $15^a$ and $15^b$, which, when in closed and normal position, as indicated in Fig. 6 of the drawing, represent an ordinary plane structure, the front edge portion of the member $15^a$ being upturned as at 18, and the corresponding edge portion of the member $15^b$ being curved downwardly as seen at 19, forming the rounded edge portion common in the planes of aeroplanes, and the members $15^a$ and $15^b$ curve upwardly and backwardly and terminate in apparently straight rear end portions.

It will be understood that each member $15^a$ and $15^b$ will be constructed along lines similar to the construction of the present supporting planes so that when said members are separated, as later described, two supporting plane members are formed thereof, instead of one, thus increasing the lifting capacity or stability of the plane to the percent of the surface of the supplemental supporting plane member $15^b$.

Mounted in connection with the plane member $15^b$ substantially centrally with reference to the front and rear edges thereof, and equi-distant from the longitudinal centre of the fuselage or body 10, are two rods 20 having mounting plates 21 at their upper ends for attachment to the member $15^b$, and coupled with the members 15ª, in vertical alinement with the rods 20, are other rods 22, the upper ends of which are tubular in form as seen at 23, note Fig. 5, to form a chamber for comparatively heavy springs 24 mounted on the rods 20 and seating at the base of the tubular portion of the rods 22, as seen at 25. The springs 24 are adapted to move the member 15ᵇ out of engagement with the member 15ª and in spaced relation thereto, as later described.

The rods 22, in the construction shown, extend downwardly to the plane 16, and mounted on said rods between the planes 15 and 16 are brackets 26 for supporting a winding shaft 27, which extends from one bracket 26 to the other and through the fuselage 10 of the machine. Mounted on the shaft 27, within the brackets 26, are two pairs of drums 28—29, 30—31 on which are wound light cables, wires or similar strands 32, and said strands are arranged in groups of three on each drum, and extend from said drums around pulleys 33 which are arranged, in groups of three, for the separate strands leading from said drums, note Fig. 7, and said strands extend up through apertures 34 in the mounting plates 22ª for the rods 22 in connection with the plane member 15ª, and then pass around pulleys 35 coupled with the mounting plates 21 for the rods 20 and extend radially from the rods 20 to the peripheral points on the member 15ᵇ indicated at 36, 37, 38, 39, 40, 41, 42, 43, 44 and 45 in Fig. 4 of the drawing, where they pass around pulleys 46 secured to the under-face of the plane member 15ᵇ note Figs. 1 and 6, and also secured to eyes or loops 47 on the upper and inner faces of the member 15ª as seen in said figure.

From the foregoing it will be clear, that the free ends of the cables or other strands 32 extend from the points 36 to 45 inclusive, on the plane member 15ª to the separate drums 28, 29, 30 and 31 around the pulleys and other guiding means employed. In order to move the plane member 15ᵇ from its extended position back to the normal position, as seen in Fig. 6, the drums 28—31 are rotated by the rotation of the shaft 27, and this result is accomplished by providing a large gear 48 on the shaft 27, centrally thereof, and preferably in the cock-pit 10ª of the fuselage, the shaft and gear being supported by a suitable frame 49, within the fuselage, and a pinion 50 supported in the frame 49 is rotated by means of a hand crank and in mesh with the gear 48.

It will be understood that any type of gearing may be employed for rotating the shaft 27, and further my invention is not necessarily limited to manually operated means. A pawl 52 pivoted to the frame 49 engages the gear 48 to lock the same, and the shaft 27, against rotation when the plane member 15ᵇ is lowered into the position shown in Fig. 6 of the drawing, the pawl being held in position with the gear by a spring 53, and an operative link or rod 54 extends backwardly from the pawl 52 to a convenient point, where the operator or pilot of the machine may actuate the same to release the shaft and gear to permit the springs 24 to move the plate 15ᵇ to a raised position and to allow the cable or strand to be unwound from the drums 28—31.

I also preferably provide the peripheral points of the plane members 15ᵇ with a skirt portion 55 composed of canvas, silk or other suitable material, such as commonly employed in the construction of parachutes and like apparatus, and the upper edges of said skirt are fixedly secured to the edges of the member 15ᵇ, and the lower edges are attached at intervals, as seen at 56, to the cables or other strands, or to the member 15ª, where such cables or strands are attached thereto at the points 36 to 45 inclusive. The edges of the skirt portion 55, between the points 56, is preferably curved upwardly, as seen at 57, to allow for the passage of air above the plane member 15ª, and into the compartment 58 formed within the skirt portion 55 and below the member 15ᵇ, thus forming of said member 15ᵇ a parachute structure, in addition to supporting the area of the member 15ᵇ in itself. In the operation of the device, the skirt portion 55 will flare outwardly under the action of the air when the aeroplane is descending.

The operation of my improved apparatus will be readily understood from the foregoing description when taken in connection with the accompanying drawings and the following statement. Assuming that the aeroplane is in flight and the plane members 15ª and 15ᵇ are in the position shown in Fig. 6 of the drawing, it being noted that the skirt portion 55 is contained within and between said members 15ª and 15ᵇ, if the aeroplane should fail to properly function for any reason, for example, in the failure of the function of the motor of the aeroplane, the sudden drop or descent of the plane may be checked and a gradual lighting of the plane be effected by the pilot or operator pulling upon the link 54 to release the pawl 52 from the gear 42, thus releasing the shaft 27 and the drums 28—31 thereof, and allowing the springs 24 to exert sudden upward pressure upon the plane member 15ᵇ, releasing the same from the plane member 15ª and moving it into the position shown in Figs. 1, 2 and 5, this operation is checked by the cables or other strands 32 and further by the skirt portion 55. It will be understood that the air rushing in under and beneath the member 15ᵇ will later aid in the above operation, and when in fully extended position as seen in Fig. 1, the parachute structure will be sufficient in its capacity itself, and in conjunction with the other supporting plane surfaces of the aeroplane, to maintain the load of the plane in atmosphere to such a degree, to provide for a slow descent of the aeroplane to effect a landing under the control of the operator, which would be of no greater difficulty to perform than if the aeroplane was in full control of the operator, in so far as the power of the aeroplane is concerned.

It will be understood that my invention is not necessarily limited to the use of the skirt portion forming a substantial parachute structure, as the increased area and supporting properties of the supplemental plane member 15<sup>b</sup> in itself would be sufficient to accomplish the desired result and, as previously stated, it will be understood that my invention is not necessarily limited in its use, in connection with any particular type of aeroplane, nor am I necessarily limited to the use of a single auxiliary or supplemental plane or parachute structure as a number of these devices may be employed on the separate planes of an aeroplane apparatus, and various other changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. In an aeroplane, a main supporting plane, a supplemental supporting plane normally constituting part of the main plane, telescoping rods arranged in spaced relation on the main and supplemental planes, springs on one of each of said rods adapted to move the supplemental plane in spaced relation to the main plane, a plurality of flexible strands coupled with the peripheral edge portions of the main plane and extending around pulleys on the supplemental plane in alinement with the coupling thereof with the main plane, and means involving drums mounted upon a shaft supported in the aeroplane for winding and releasing said flexible strands in the movement of the supplemental plane into operative or inoperative position.

2. In an aeroplane, a main supporting plane, a supplemental supporting plane normally constituting part of the main plane, telescoping rods arranged in spaced relation on the main and supplemental planes, springs on one of each of said rods adapted to move the supplemental plane in spaced relation to the main plane, a plurality of flexible strands coupled with the peripheral edge portions of the main plane and extending around pulleys on the supplemental plane in alinement with the coupling thereof with the main plane, means involving drums mounted upon a shaft supported in the aeroplane for winding and releasing said flexible strands in the movement of the supplemental plane into operative or inoperative position, and means for rotating said shaft and the drums thereof for moving the supplemental plane from an operative to an inoperative position.

3. In an aeroplane, a main supporting plane, a supplemental supporting plane normally constituting part of the main plane, telescoping rods arranged in spaced relation on the main and supplemental planes, springs on one of each of said rods adapted to move the supplemental plane in spaced relation to the main plane, a plurality of flexible strands coupled with the peripheral edge portions of the main plane and extending around pulleys on the supplemental plane in alinement with the coupling thereof with the main plane, means involving drums mounted upon a shaft supported in the aeroplane for winding and releasing said flexible strands in the movement of the supplemental plane into operative or inoperative position, means for rotating said shaft and the drums thereof for moving the supplemental plane from an operative to an inoperative position, and means for retaining said supplemental plane in inoperative position against the tension of said springs.

4. In an aeroplane, a main supporting plane, a supplemental supporting plane normally constituting part of the main plane, telescoping rods arranged in spaced relation on the main and supplemental planes, springs on one of each of said rods adapted to move the supplemental plane in spaced relation to the main plane, a plurality of flexible strands coupled with the peripheral edge portions of the main plane and extending around pulleys on the supplemental plane in alinement with the coupling thereof with the main plane, means involving drums mounted upon a shaft supported in the aeroplane for winding and releasing said flexible strands in the movement of the supplemental plane into operative or inoperative position, means for rotating said shaft and the drums thereof for moving the supplemental plane from an operative to an inoperative position, means for retaining said supplemental plane in inoperative position against the tension of said springs, and said supplemental plane having a peripheral skirt portion forming thereof a parachute body.

5. In an aeroplane, a supporting plane consisting of upper and lower plane members, the lower and outer surface of the lower plane member being slightly concave adjacent its forward end portion and having an upwardly and backwardly curved flange at its forward edge, and the upper member being convex adjacent its forward end, and said forward end having a downwardly and backwardly curved flange cooperating with the flange of the lower member to form a rounded nose or front end to the complete supporting plane when the separate members thereof are in normal and coupled relation, and means whereby said members may be separated to form thereof two independent supporting members.

6. In an aeroplane, a supporting plane consisting of upper and lower plane members, the lower and outer surface of the lower plane member being slightly concave adjacent its forward end portion and having an upwardly and backwardly curved flange at its forward edge, and the upper member being convex adjacent its forward end, and said forward end having a downwardly and backwardly curved flange cooperating with the flange of the lower member to form a rounded nose or front end to the complete supporting plane when the separate members thereof are in normal and coupled relation, means whereby said members may be separated to form thereof two independent supporting members, said members when coupled together forming a chamber therebetween, and a skirt portion coupled with the peripheral edges of the upper plane member and coupled with the lower plane member at spaced intervals, said skirt portion being normally contained within the chamber formed between said members.

7. In an aeroplane, a supporting plane consisting of upper and lower plane members, the lower and outer surface of the lower plane member being slightly concave adjacent its forward end portion and having an upwardly and backwardly curved flange at its forward edge, and the upper member being convex adjacent its forward end, and said forward end having a downwardly and backwardly curved flange cooperating with the flange of the lower member to form a rounded nose or front end to the complete supporting plane when the separate members thereof are in normal and coupled relation, means whereby said members may be separated to form thereof two independent supporting members, said members when coupled together forming a chamber therebetween, a skirt portion coupled with the peripheral edges of the upper plane member and coupled with the lower plane member at spaced intervals, said skirt portion being normally contained within the chamber formed between said members, said skirt portion being capable of outward flexing when the plane members are separated, to form thereof and in conjunction with the upper plane member, a parachute structure, the chamber of which is open to atmosphere.

8. In an aeroplane, a supporting plane consisting of upper and lower plane members, the lower and outer surface of the lower plane member being slightly concave adjacent its forward end portion and having an upwardly and backwardly curved flange at its forward edge, and the upper member being convex adjacent its forward end, and said forward end having a downwardly and backwardly curved flange cooperating with the flange of the lower member to form a rounded nose or front end to the complete supporting plane when the separate members thereof are in normal and coupled relation, means whereby said members may be separated to form thereof two independent supporting members, said member when coupled together forming a chamber therebetween, a skirt portion coupled with the peripheral edges of the upper plane member and coupled with the lower plane member at spaced intervals, said skirt portion being normally contained within the chamber formed between said members, said skirt portion being capable of outward flexing when the plane members are separated to form thereof, and in conjunction with the upper plane member, a parachute structure, the chamber of which is open to atmosphere, and means under the control of the operator for causing said plane members to be separated, and said last named means including means for returning the plane members to normal position.

9. In an aeroplane, a supporting plane consisting of upper and lower plane members, the lower and outer surface of the lower plane member being slightly concave adjacent its forward end portion and having an upwardly and backwardly curved flange at its forward edge, and the upper member being convex adjacent its forward end, and said forward end having a downwardly and backwardly curved flange cooperating with the flange of the lower member to form a rounded nose or front end to the complete supporting plane when the separate members thereof are in normal and coupled relation, means whereby said members may be separated to form thereof two independent supporting members, said members when coupled together forming a chamber therebetween, a skirt portion coupled with the peripheral edges of the upper plane member and coupled with the lower plane member at spaced intervals, said skirt portion being normally contained within the chamber formed between said members, said skirt portion being capable of outward flexing when the plane members are separated to form thereof and in conjunction with the upper plane member, a parachute structure, the chamber of which is open to atmosphere, flexible stays coupled with the respective plane members at spaced intervals for supporting said members in extended and collapsed positions, and a winding mechanism with which said stays are coupled for moving the plane members from an extended to a collapsed position.

In testimony that I claim the foregoing as my invention I have signed my name this 27th day of May, 1927.

WILLIAM H. FORSYTH.